Patented July 19, 1932

1,868,145

UNITED STATES PATENT OFFICE

LOUIS H. HOWLAND, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.   Application filed March 31, 1930.   Serial No. 440,629.

This invention relates to the treatment of rubber and similar vulcanizable materials and particularly to accelerating the vulcanization of the same with amino acridines.

An object of this invention is to provide a new class of accelerators for the vulcanization of rubber. A further object is to provide a class of accelerators which function well in stocks containing more than 30 parts by weight of carbon black per 100 parts of rubber, that is, such as tire tread stocks.

Accordingly the invention comprises vulcanizing rubber in the presence of an amino acridine and preferably one having hydrogen attached to the carbon atom in the 5-position and in which an amino group is attached to each of the benzene nuclei. The amino groups may be primary amino groups or monoalkyl or dialkyl substituted amino groups. The acridine ring may be further substituted in any position other than the 5-position by other groups such as alkyl or halogen groups.

The amino acridines of the kind described may be represented by the structural formula

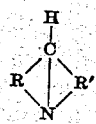

wherein R and R' represent ortho-arylene groups, and wherein R and R' each contain an amino, alkylamino, or dialkylamino group attached to the aromatic nucleus.

The substituents are numbered according to their positions, as indicated in the following diagram of the acridine ring:

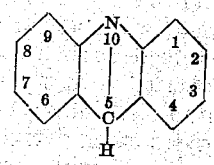

It is believed that when these bodies are used in rubber, a reaction takes place, during the vulcanization, between sulfur and the acridine compound at the 5-position, thus giving a thio body which probably functions as the actual accelerator. This conclusion is based on the fact that when a substituted acridine having hydrogen as the substituent in the 5-position is warmed with sulfur at a temperature below the temperature of vulcanization, hydrogen sulfide is evolved. It is also known that when acridine is heated with sulfur at an elevated temperature the sulfur enters the molecule in the 5-position.

Typical of the amino acridines are such as 2,8 diamino-3,7 dimethyl acridine; 2,8-dimethylamino acridine; tetra methyl diamino acridine; 7-amino-3-methylamino-8 methyl acridine; 9-amino-3-dimethylamino-6 chloro acridine, 3,7-diamino acridine; 3,7-diamino-2-methyl acridine.

The structure of diamino dimethyl acridine would correspond to

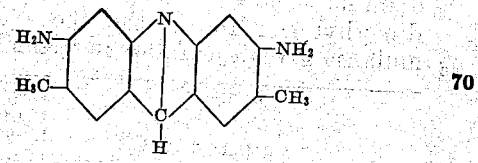

and tetra methyl diamino acridine to

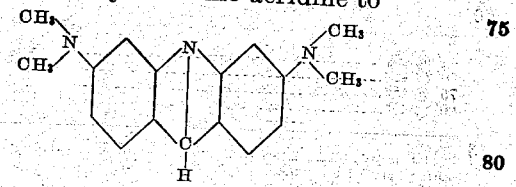

The following examples in which the parts are by weight are illustrative of the invention and are not to be construed as limiting thereof:

*Example A.*—I mix on the mill in the usual manner 1 part of diamino dimethyl acridine with a typical tread stock containing 100 parts of smoked sheet rubber. Samples of this stock are vulcanized in a mold under 45 pounds steam pressure for 45, 60, 75, and 90 minutes and are then found to be well cured and give the following tensiles in pounds per sq. in.:

| Cure | Stock containing diamino dimethyl acridine | |
|---|---|---|
|  | T | E |
| 45' @ 45# | 4090 | 590% |
| 60' @ 45# | 3900 | 540% |
| 75' @ 45# | 3725 | 520% |
| 90' @ 45# | 3790 | 540% |

(T represents tensile strength and E represents per cent elongation at break.)

In the absence of the accelerator practically no vulcanization takes place, the tensile strength being approximately 1200 lbs. per sq. in. after heating under similar conditions.

*Example B.*—100 parts of pale crepe rubber, 10 parts zinc oxide, 3 parts of sulfur and .5 parts of diamino dimethyl acridine are mixed on the mill in the usual manner. This mix is vulcanized in a mold under 40 pounds steam pressure for 30 and 60 minutes and the following tensiles are obtained:

| Cure | Stock containing diamino dimethyl acridine | |
|---|---|---|
|  | T | E |
| 30' @ 40# | 2645 | 760% |
| 60' @ 40# | 3835 | 750% |

(T represents tensile strength and E represents per cent elongation at break.)

In a similar stock containing no accelerator, no vulcanization takes place under similar conditions.

*Example C.*—When 1 part of tetra methyl diamino acridine is substituted for diamino dimethyl acridine in the above tread formula, it gives the following tensiles:

| Cure | Stock containing tetramethyl diamino acridine | |
|---|---|---|
|  | T | E |
| 45' @ 45# | 3915 | 610% |
| 60' @ 45# | 4025 | 610% |
| 75' @ 45# | 4085 | 590% |
| 90' @ 45# | 3825 | 570% |

(T represents tensile strength and E represents per cent elongation at break.)

The chemicals disclosed may be used for acceleration of vulcanization of any type of rubber stock and are not to be confined to mixes containing carbon black.

Although certain theories in explanation of a mode of reaction during vulcanization are advanced herein, the invention is not to be construed as confined thereto but is to cover the effect whatever the actual mode of action of the acridine. It is further obvious that, from the detailed disclosure above given, modifications will suggest themselves without departing from the principle of the invention, and it is not desired to limit the invention otherwise than as set forth in the appended claims.

Having thus described my invention, what I claim and desire to protect by Letters Patent is:

1. A process for vulcanizing rubber which comprises treating rubber with a vulcanizing agent and an amino acridine.

2. A process for vulcanizing rubber which comprises treating rubber with a vulcanizing agent and a diamino acridine having an amino group attached to each of the benzene nuclei.

3. A process for vulcanizing rubber which comprises treating rubber with sulphur and a diamino acridine having an amino group attached to each of the benzene nuclei and hydrogen attached to carbon in the 5-position.

4. A process which comprises vulcanizing rubber stock containing a metallic oxide and a vulcanizing agent in the presence of a diamino acridine which has hydrogen attached carbon in the 5-position.

5. A process which comprises vulcanizing a rubber stock containing zinc oxide and sulphur in the presence of an alkyl diamino acridine which has hydrogen attached to carbon in the 5-position.

6. A process which comprises vulcanizing a rubber stock containing zinc oxide and sulphur in the presence of a diamino dimethyl acridine which has hydrogen attached to carbon in the 5-position.

7. A process which comprises vulcanizing a rubber stock containing zinc oxide and sulphur in the presence of 2,8-diamino-3,7-dimethyl acridine.

8. A vulcanized rubber product derived from rubber treated with a vulcanizing agent and an amino acridine.

9. A vulcanized rubber product derived from rubber treated with a metallic oxide, a vulcanizing agent, and a diamino acridine in which hydrogen is attached to carbon in the 5-position.

10. A vulcanized rubber product derived from rubber treated with zinc oxide, sulphur and an alkyl diamino acridine having hydrogen attached to carbon in the 5-position.

11. A vulcanized rubber product derived from rubber treated with zinc oxide, sulphur and a diamino dimethyl acridine having hydrogen attached to carbon in the 5-position.

12. A vulcanized rubber product derived from rubber treated with zinc oxide, sulphur and 2,8-diamino-3,7-dimethyl acridine.

13. A tire tread stock derived from rubber treated with a vulcanizing agent, a metallic oxide, at least 30 parts by weight of carbon black per 100 parts of rubber, and an accelerator comprising a diamino acridine having an amino group attached to each of the benzene nuclei and hydrogen attached to carbon in the 5-position.

14. A tire tread stock derived from rubber treated with sulphur, zinc oxide, at least 30 parts by weight of carbon black per 100 parts of rubber, and an accelerator comprising 2,8-diamino-3,7-dimethyl acridine.

Signed at Passaic, county of Passaic, State of New Jersey, this 21st day of March, 1930.

LOUIS H. HOWLAND.